United States Patent [19]
Tantlinger

[11] 3,931,770
[45] Jan. 13, 1976

[54] PASSENGER HAND ASSIST RAIL FOR TRANSIT VEHICLE

[75] Inventor: Keith W. Tantlinger, Coronado, Calif.

[73] Assignee: Rohr Industries, Inc., Chula Vista, Calif.

[22] Filed: Sept. 26, 1974

[21] Appl. No.: 509,329

[52] U.S. Cl. ............... 105/354; 16/110 R; 256/59; 280/150 R; 296/28 A
[51] Int. Cl.² ........................................... B60N 5/00
[58] Field of Search ............... 16/110 R; 256/59, 60; 105/354, 329 R; 280/150; 296/71, 28 A

[56] References Cited
UNITED STATES PATENTS

| 1,274,063 | 7/1918 | Linn | 105/354 |
| 1,350,657 | 8/1920 | Kirschmann | 105/354 |
| 2,264,637 | 12/1941 | Landell | 105/329 R |
| 2,672,103 | 3/1954 | Hohmes | 105/354 |

Primary Examiner—M. Henson Wood, Jr.
Assistant Examiner—Richard A. Bertsch
Attorney, Agent, or Firm—Patrick J. Schlesinger

[57] ABSTRACT

A hand assist rail for a transit vehicle comprises an aluminum extrusion of Y cross sectional shape with a bulbous, preferably laterally offset, bottom portion shaped for gripping by hand of a passenger standing in the aisle of such vehicle. A resilient cushion of conforming shape comprises the under side of the bulbous hand grip bottom portion, and a web portion of the rail which comprises the stem of the Y preferably is reversely curved to permit the thumb and fingers of a hand grasping the bulbous bottom portion to overlap.

12 Claims, 3 Drawing Figures

PASSENGER HAND ASSIST RAIL FOR TRANSIT VEHICLE

BACKGROUND OF THE INVENTION

In the past it has been common practice in transit vehicles such as buses and urban and interurban rail cars to provide some sort of assist means for use by passengers standing on or walking along the aisle of the vehicle. Such prior means have included well known strap loops depending from the ceiling of the vehicle, rails such as those shown in U.S. Pat. No. 1,274,063, and individual grips such as those shown in U.S. Pat. No. 1,350,657. The prior strap loops and individual grips, not being continuous, are of limited help to a person walking down the aisle of a vehicle in which they are installed, while the prior types of rails usually have been mounted on spaced standards which require a passenger to release his grip on the rail and pass his hand around these standards as he comes to them. All of these prior types of assists are difficult to secure properly to the light ceiling structures of modern transit vehicles, and may require the provision of reinforcing mounting means for their attachment.

SUMMARY OF THE INVENTION

The hand assist rail of the present invention is light, rigid, and continuous, the upper portion thereof comprising diverging web portions with means for attaching the upper edges of these web portions in conforming, substantially sealed relation to the vehicle ceiling to provide a duct for the conduction of heating and cooling air. Outlet openings are provided at selected spaced intervals along the duct thus formed to distribute such air to both seated and standing passengers. A third integral web portion depends from the junction of the diverging web portions, and preferably is in the form of a reverse curve. A bulbous hand grip portion, preferably cushioned on its under side extends along the lower edge of the depending web portion, and, preferably is offset laterally from the lower edge of the web portion, which feature, together with the reverse curvature of the depending web protion, allows the thumb and fingers of a hand grasping the rail to overlap.

BRIEF DESCRIPTION OF THE DRAWINGS

The objectives and advantages of the invention will be apparent from the following description and the accompanying drawings, wherein.

DETAILED DESCRIPTION OF THE DRAWINGS

Figure 1:
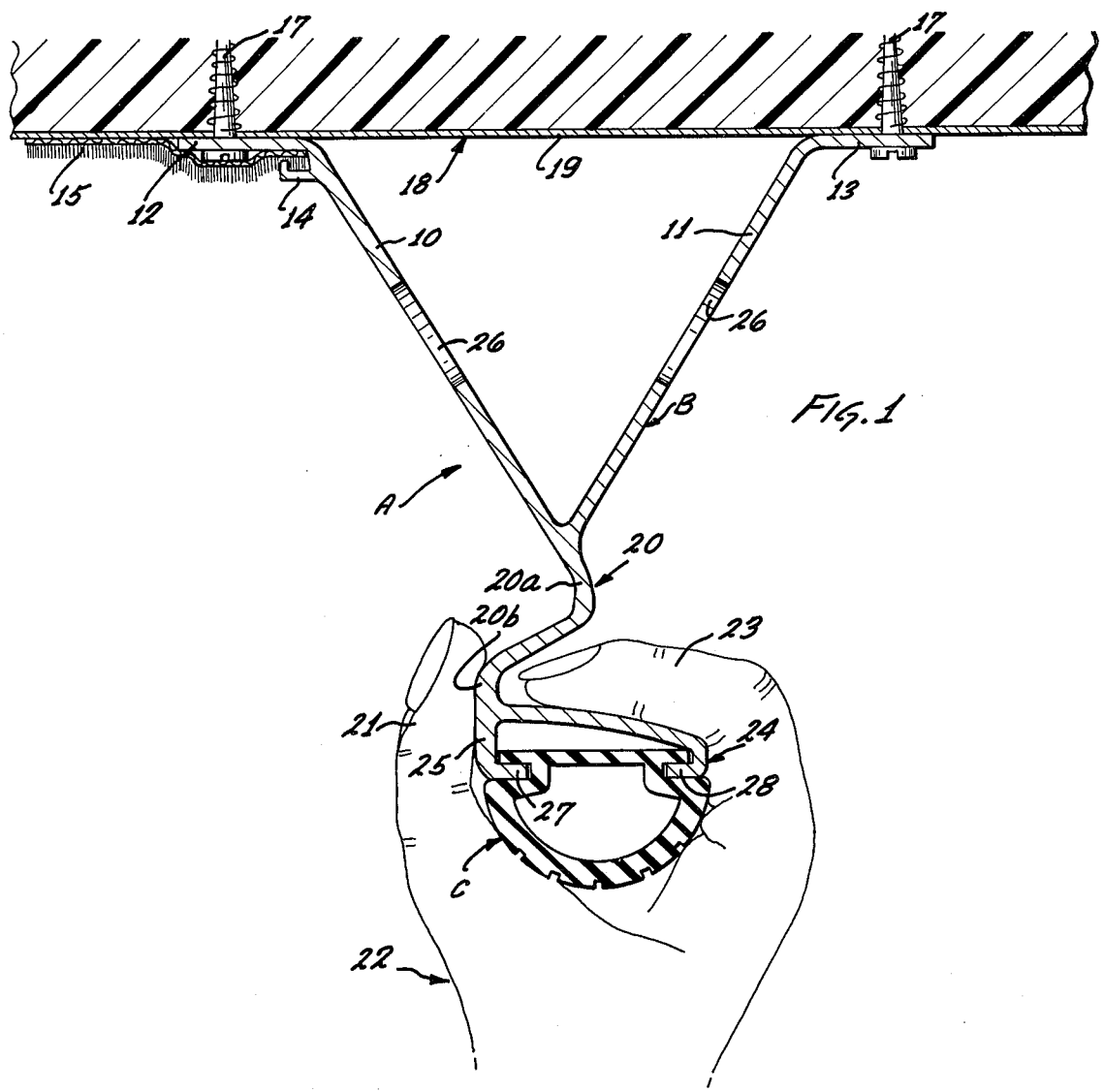
FIG. 1 is a transverse, sectional view of a preferred form of the invention as it appears when mounted along the ceiling of a transit vehicle.

In the presently preferred form of the invention shown in FIG. 1, a passenger assist hand rail A embodying the invention is of generally Y cross-sectional shape and consists of an aluminum extrusion B and a tubular elastomeric cushion C. The upper portion of the extrusion A comprises two upwardly diverging web portions 10 and 11 intersecting along their lower edges with laterally extending mounting flanges 12 and 13 along their respective upper edges. A ceiling liner retaining lip 14 is formed externally along the web portion 10 and is spaced from the mounting flange 12 to provide a recess to receive and support a side edge of a ceiling liner 15 therein. As illustrated, the ceiling liner 15 is of carpeting material. Screw holes are provided at selected spaced intervals along the flanges 12 and 13, preferably by means of conventional line pierce dies, to receive screws 17 for mounting the assist rail A to the vehicle ceiling 18. The latter, as illustrated, comprises a urethane structural foam sandwich with thim aluminum top and bottom sheets, only the bottom sheet 19 being shown. The assist rail A and ceiling 18 are mutually shaped to provide substantially sealed joints between the mounting flanges 12 and 13 and the ceiling. If desired a suitable sealant, for example, a butyl rubber compound, may be applied to the flanges to insure a complete seal.

A web portion 20 depends from the intersection of the diverging flanges 10 and 11 and comprises the stem of the Y shaped extrusion B. This depending web portion 20 defines a reverse curve, the upper portion 20a of which curves to the left, as shown in FIG. 1, to permit the thumb 21 of a user's hand 22 to extend upwardly thereon and overlap the user's fingers 23, which extend onto a shelf-like surface provided by the sharply reversely curved lower portion 20b of the web 20. This latter portion is part of a bulbous hand grip bottom portion 24 of the hand assist rail A.

A short web portion 25 completes the upper part of the bulbous hand grip bottom portion 24, and a pair of inwardly extending locking lips 27 and 28 are provided along the lower edges of the web portions 20b and 25, respectively, to have interlocking, supporting relation with a pair of side grooves provided in the generally hemicylindrical, tubular cushion C, which comprises the complementary lower portion of the bulbous hand grip bottom portion 24. The cushion C preferably is a tubular extrusion of suitable elastomeric material, such as rubber or resilient plastic material, and may be assembled with the supporting extrusion B by being drawn relatively endwise into its illustrated position, preferably after both parts have been cut to required length for installation in the vehicle in which the assist rail A is to be installed.

A plurality of air discharge openings 26 of selected size, and at selected spaced, intervals, are provided in either or both of the diverging web portions 10 and 11 for discharging into the vehicle heating or cooling ventilating air from the duct provided between the diverging web portions and the bus ceiling 18.

OPERATION OF THE FORM OF THE INVENTION SHOWN IN FIG. 1

With the extrusions B and C cut to length and assembled as shown in FIG. 1, the mounting flanges 12 and 13 are placed in conforming position against the vehicle ceiling 18 and are secured thereto in sealing, or substantially sealing, relation by the mounting screws 17. The ceiling liner 15 is then installed with its edge fitted into the recess between the mounting flange 12 and lip 14. The triangular duct provided by the flanges 10 and 11 and the ceiling 18 is then connected in a suitable or well known manner to the usual heating or air conditioning mechanism of the vehicle in which the assist rail A is installed.

One of the assist rails A is installed preferably along each side of the vehicle ceiling so as to provide a convenient assist for either hand of a passenger standing in the aisle of the vehicle. As shown in FIG. 1, assuming that the rail A is mounted along the right hand side of the vehicle ceiling, the other or left hand rail preferably is reversed end-for-end. Either rail can be grasped by a passenger facing either forwardly or rearwardly in the bus, and the thumb and fingers of a hand grasping the rail can overlap to provide a firm grasp of the rail. It is obvious when the rail is grasped by a person facing the opposite way in the bus, the position of the thumb and fingers on the rail are reversed from their position shown in FIG. 1.

MODIFIED FORMS OF THE INVENTION SHOWN IN FIGS. 2 AND 3

Figures 2, 3:
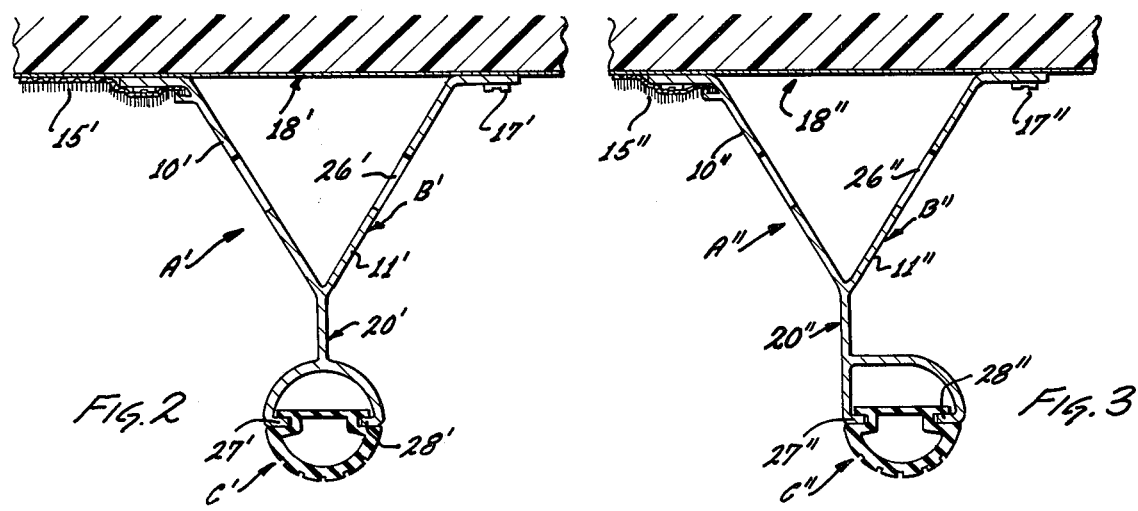
FIGS. 2 and 3 are generally similar views in reduced scale of modified forms of the invention.

The differences between the forms of the invention shown in FIGS. 2 and 3 and that shown in FIG. 1 reside in the shape of the depending web portion, which in FIG. 1 is designated 20, and the relative location thereon of the bulbous lower portion.

Since the various parts of the forms of the invention shown in FIGS. 2 and 3 correspond generally to those of FIG. 1, the same reference numerals are employed to designate corresponding parts thereof, with the exception that in FIG. 2 a prime (') is added, and in FIG. 3 a double prime ('').

In FIG. 2 the depending web portion 20' is flat and upright, and the bulbous lower portion C' is centered thereon, while in FIG. 3 the bulbous lower portion C'' is offset laterally from a flat depending web portion 20''.

The operation of the forms of the invention shown in FIGS. 2 and 3 will be obvious to one familiar with the operation of the form of the invention shown in FIG. 1 as described previously herein.

A slight decrease in cost may result from the use of either of the forms shown in FIGS. 2 and 3, but neither of the latter forms permits the desirable overlap of the thumb and fingers achieved by that shown in FIG. 1.

The invention provides a sturdy, good looking, and inexpensive hand assist rail for transit vehicles, and one which, without additional expense, provides a concealing support for the edge of the ceiling liner and a duct for the conduction and dispersion of heating and cooling air for the vehicle. The rail is cushioned along its under side to prevent injury to the head of a passenger who might bump it upon arising from a seat in the vehicle. The smooth continuous nature of the rail permits the hand of a user to slide freely therealong without necessitating release of the grip in passing along its entire length, and is free of screw heads or other elements which might scratch or otherwise cause injury to a passenger.

Having thus described by invention, what is claimed as new and useful and desired to be secured by U.S. Letters Patent is:

I claim:

1. An elongate hand assist rail secured to, and extending lengthwise along an upper portion of a transportation vehicle having a floor, side walls and ceiling, said rail being of substantially uniform cross sectional size and shape throughout its length, and comprising:
   a pair of diverging web portions intersecting and joined along their converging edges;
   means for mounting the free edges of the diverging web portions to such upper portion of the vehicle;
   a third web portion extending from the intersection of the diverging web portions; and
   a hand grip portion of bulbous cross sectional shape substantially integral with, and extending along, the free edge of the third web portion.

2. A hand assist rail as claimed in claim 1, wherein the under side of the bulbous hand grip bottom portion is cushioned.

3. A hand assist rail as claimed in claim 1, wherein the bulbous hand grip portion comprises an upper, generally hemi-cylindrical portion integral with the depending web portion, and a lower, cushion portion of generally hemi-cylindrical shape attached to, and complementary with, said upper portion.

4. A hand assist rail as claimed in claim 1, wherein the upper edges of the diverging web portions are fitted in substantially sealing relation to the vehicle ceiling to form a duct between the ceiling and the diverging web portions for the conduction of heating and cooling air, at least one of the diverging web portions having a plurality of air discharging openings therein spaced at selected distances therealong.

5. A hand assist rail as claimed in claim 1, wherein a laterally extending attaching flange is provided along the upper edge of each of the diverging web portions, and attaching means secure the attaching flanges to the ceiling.

6. A hand assist rail as claimed in claim 5, wherein a recess is provided along the junction of at least one of the diverging web portions and its attaching flange, the material defining the recess being shaped to receive therein an edge portion of selected covering material applied to the vehicle ceiling.

7. A hand assist rail as defined in claim 6 wherein the bulbous hand grip bottom portion is offset laterally from its supporting, depending web portion.

8. A hand assist rail as claimed in claim 7 wherein the depending web portion is reversely curved, and the bulbous hand grip bottom portion is offset substantially its full width from the lower edge of the reversely curved portion, whereby the thumb and fingers of a hand grasping the bulbous hand grip lower portion may overlap.

9. A hand assist rail as claimed in claim 8 wherein the diverging web portions, the depending web portion, and the upper portion of the bulbous hand grip lower portion comprise an integral extrusion of rigid, strong material, and at least the lower portion of the bulbous hand grip lower portion is of resilient cushioning material.

10. A hand assist rail as claimed in claim 9 wherein the reversely curved depending web portion comprises an upper portion which curves sharply in one direction to provide support for the thumb or fingers of a person's hand grasping the bulbous hand grip bottom portion, and then curves sharply in the reverse direction to substantially horizontal porition to provide support for the fingers or thumb of a hand grasping the bulbous hand grip bottom portion, whereby the thumb and fingers of such hand may overlap.

11. A hand assist rail as claimed in claim 10 wherein a short web portion extends downwardly from an initial portion of the reversely curved portion, to form, with the reversely curved portion, substantially the upper half of the bulbous lower hand grip portion, and the cushion is attached to the lower edges of the web portions defining such substantially upper half of the bulbous lower hand grip portion.

12. A hand assist rail as claimed in claim 1 wherein the hand rail comprises a continuous length of extruded aluminum.

* * * * *